United States Patent
Mitten et al.

(10) Patent No.: US 7,302,548 B1
(45) Date of Patent: Nov. 27, 2007

(54) SYSTEM AND METHOD FOR COMMUNICATING IN A MULTI-PROCESSOR ENVIRONMENT

(75) Inventors: John W. Mitten, Cary, NC (US);
William R. Lee, Apex, NC (US);
Trevor S. Garner, Apex, NC (US);
Robert L. King, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 627 days.

(21) Appl. No.: 10/174,716

(22) Filed: Jun. 18, 2002

(51) Int. Cl.
*G06F 15/00* (2006.01)
*G06F 15/76* (2006.01)

(52) U.S. Cl. .................. 712/11; 712/28; 712/32; 712/34; 712/203

(58) Field of Classification Search ............ 712/11, 712/32, 28, 34, 203
See application file for complete search history.

(56) References Cited

U.S. PATENT DOCUMENTS

| | | | |
|---|---|---|---|
| 4,325,116 A * | 4/1982 | Kranz et al. | 711/151 |
| 4,750,113 A | 6/1988 | Buggert | 364/200 |
| 4,811,216 A * | 3/1989 | Bishop et al. | 711/153 |
| 5,129,093 A * | 7/1992 | Muramatsu et al. | 712/28 |
| 5,144,692 A | 9/1992 | Baker et al. | 395/425 |
| 5,159,686 A | 10/1992 | Chastain et al. | 395/650 |
| 5,214,759 A * | 5/1993 | Yamaoka et al. | 709/213 |
| 5,265,207 A | 11/1993 | Zak et al. | 395/200 |
| 5,361,363 A | 11/1994 | Wells et al. | 395/800 |
| 5,363,497 A | 11/1994 | Baker et al. | 395/425 |
| 5,388,214 A | 2/1995 | Leiserson et al. | 395/200 |
| 5,590,283 A | 12/1996 | Hillis et al. | 395/200.02 |
| 5,617,537 A | 4/1997 | Yamada et al. | 395/200.01 |
| 5,701,502 A | 12/1997 | Baker et al. | 395/800 |
| 5,968,160 A | 10/1999 | Saito et al. | 712/14 |

OTHER PUBLICATIONS

Stallings, William, "Computer Organization and Architecture", 1996, Prentice Hall, 4th edition, pp. 51-52.*

* cited by examiner

*Primary Examiner*—Alford Kindred
*Assistant Examiner*—Jesse R Moll
(74) *Attorney, Agent, or Firm*—Baker Botts L.L.P.

(57) ABSTRACT

A method for communicating in a multi-processor environment is provided that includes generating a bit at an originating processor associated with a message to be communicated to a destination processor. The bit is positioned in a send register associated with the originating processor and transposed from the send register of the originating processor to a receive register of the destination processor. An interrupt signal is then generated in response to the bit being transposed.

28 Claims, 3 Drawing Sheets

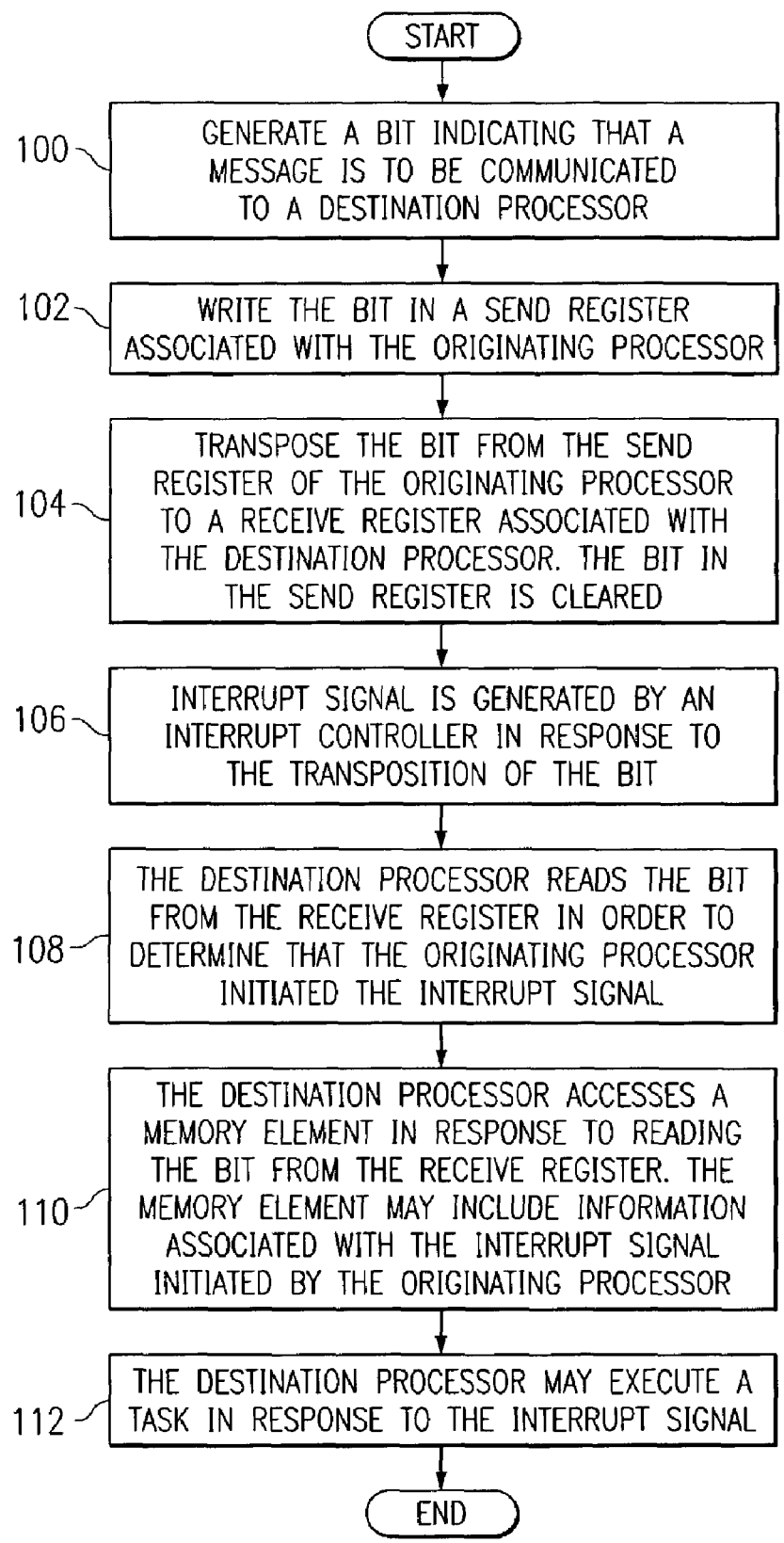

SYSTEM AND METHOD FOR COMMUNICATING IN A MULTI-PROCESSOR ENVIRONMENT

TECHNICAL FIELD OF THE INVENTION

This invention relates in general to the field of communications and more particularly to a system and method for communicating in a multi-processor environment.

BACKGROUND OF THE INVENTION

Effective communications between processors are important to the performance or the capabilities of architectures and elements that employ processors. One area of processor communications that generally inhibits system performance is the timing of communications between processors. Communications protocols that delay in transmitting or receiving messages may have a negative impact on the system. This may be due, in part, to the substantive nature of the messages being communicated between processors. In some cases, the message that is being communicated may trigger an action to be performed before the destination processor proceeds to a next task. When communications between processors are delayed, the receiving processor may act inappropriately in executing functions that disregard the incoming message. In certain scenarios, after the message has been properly received by the destination processor, conditions in the corresponding system or environment may have changed, thereby making the message irrelevant or moot. In other scenarios, multiple reads for an entity that received the interrupt or multiple writes for a broadcast message to elements within a system may result in redundancy or increased traffic, which may in turn inhibit processing speeds. Accordingly, messages between processors need to be communicated quickly and accurately to intended targets such that a processor receiving the message may act properly in response to receipt of the message.

SUMMARY OF THE INVENTION

From the foregoing, it may be appreciated by those skilled in the art that a need has arisen for an improved communications approach that provides the capability for processors or processing elements to quickly and accurately transmit and receive messages in a multi-processor environment. In accordance with one embodiment of the present invention, a system and method for communicating in a multi-processor environment are provided that substantially eliminate or greatly reduce disadvantages and problems associated with conventional communications techniques.

According to one embodiment of the present invention, there is provided a method for communicating in a multi-processor environment that includes generating a bit at an originating processor associated with a message to be communicated to a destination processor. The bit is positioned in a send register associated with the originating processor and transposed from the send register of the originating processor to a receive register of the destination processor. An interrupt signal is then generated in response to the bit being transposed.

Certain embodiments of the present invention may provide a number of technical advantages. For example, according to one embodiment of the present invention, a multi-processor communications approach is provided that offers an optimal communications path for messages intended for a selected processor. This communications path allows for quicker response times to messages or interrupt signals requiring immediate action to be taken by a processor that receives the interrupt signal. This further allows a receiving processor to act or to execute some task based on current system conditions. This is in contrast to other messaging protocols that often trigger inappropriate actions by processors because the delay in receiving the interrupt signal and the determination of the source of the interrupt message allows for system parameters to change. This multi-processor communications approach further allows for a simplistic and more direct initiation of an interrupt signal by any one of a number of processors within a given system. By setting the requisite number of bits in a send register, a corresponding processor can quickly generate a signal to be communicated to selected processors in the system.

Yet another technical advantage of one embodiment of the present invention relates to the ability of the system to easily notify another processor in the system that it has a message for that processor, regardless of which chip or on which system that processor resides. A single instruction may be generated that triggers the message or the interrupt signal to be communicated to another processor. This provides great flexibility for processors in an environment by allowing enhanced inter-communications with any selected element in the system. This approach can be further extended to send a message to all processors (a broadcast signal) in the system at one time. Additionally, such an approach is easily scalable as more processors are added to the system. With the addition of a processor, a send register and a receive register may be added to the system, whereby the number of bits in the other registers are extended one bit to accommodate for the new processor. Embodiments of the present invention may enjoy some, all, or none of these advantages. Other technical advantages may be readily apparent to one skilled in the art from the following figures, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which:

FIG. 3 is a flowchart illustrating a series of steps associated with a method for communicating in a multi-processor environment.

DETAILED DESCRIPTION OF THE INVENTION

Figure 1:
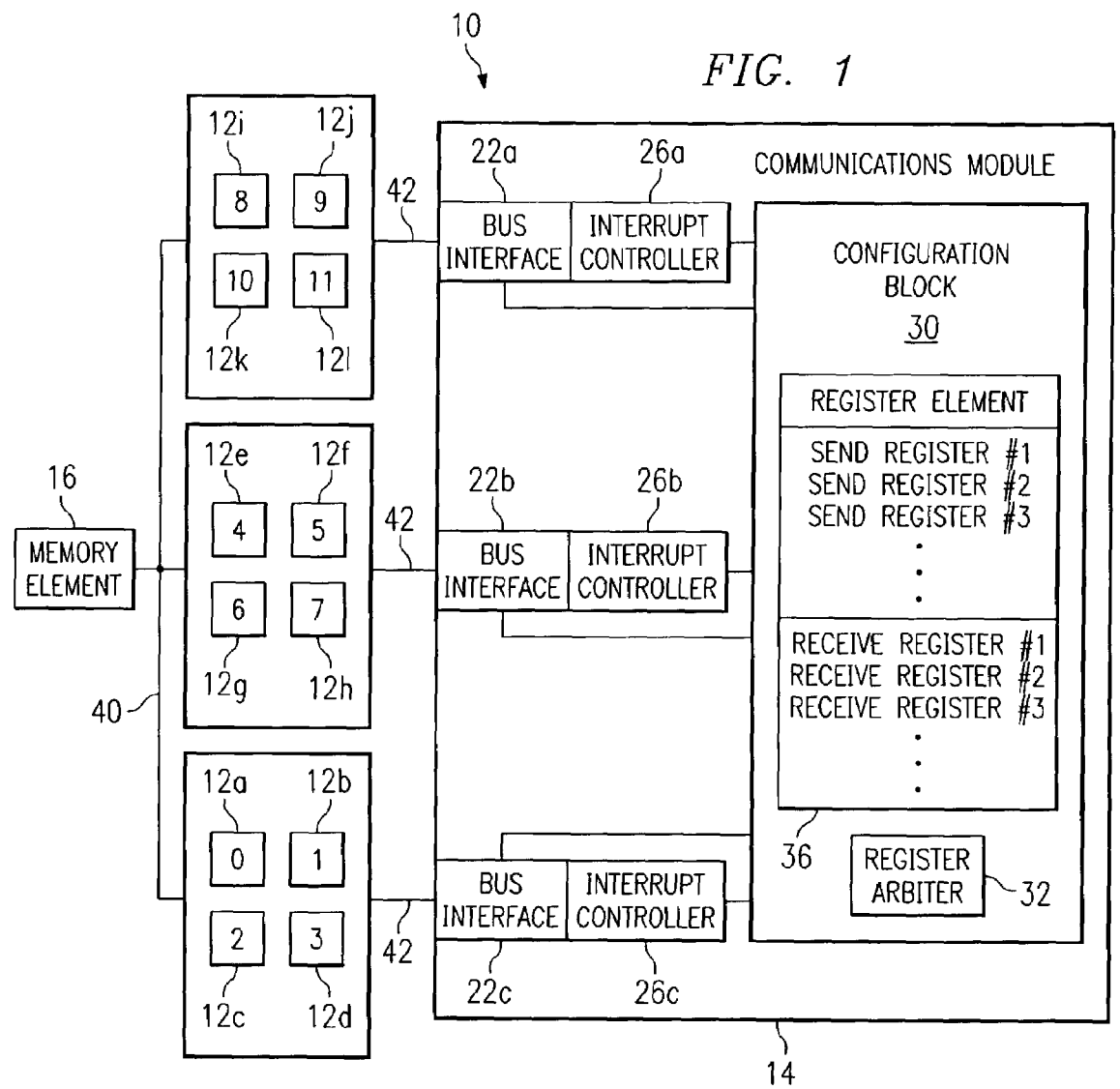
FIG. 1 is a simplified block diagram of a system for communicating in a multi-processor environment.

FIG. 1 is a simplified block diagram of a system 10 for communicating in a multi-processor environment. System 10 includes multiple processors 12*a*-12*l*, a communications module 14, and a memory element 16. Communications module 14 may include multiple bus interfaces 22*a*-22*c*, multiple interrupt controllers 26a-26c and a configuration block 30 that includes a register arbiter 32 and a register element 36.

An interrupt or messaging protocol is provided by system 10 that allows any processor 12a-12l in system 10 to communicate with any other processor 12a-12l through the sending of an interrupt signal. The interrupt signal communicates that the originating processor has a message for the receiving processor. This may be executed through the use of a pair of registers for each processor 12a-12l provided in register element 36. One register may be designated as a send register and another register designated as a receive register for each processor 12a-12l. The bits within each of the registers correspond to a processor number or a processor identification (ID) that designates the origin of the message in the case of the receive register or the destination of the message in the case of the send register.

By suitably positioning a bit in the corresponding register for a selected processor, system 10 operates to provide a multi-processor communications approach that allows for an optimal communications path for messages intended for any one of processors 12a-12l. Such a communications path offers quicker response times to messages or interrupt signals that may require immediate action to be taken by the receiving processor. This may further provide the opportunity for a receiving processor to act or to execute some task based on current system conditions or parameters. Additionally, such a multi-processor communications approach allows for a simplistic and a more direct initiation of an interrupt signal by any number of processors 12a-12l within system 10.

Processors 12a-12l are each processing units that operate to execute some task within system 10. Processors 12a-12l may be central processing units (CPUs), or any other processing element or object operable to generate or otherwise initiate a message in system 10. Processors 12a-12l may communicate with each other via a link 40. Link 40 may be a communications bus or any other suitable communicative interface that allows for intercommunications among processors 12a-12l providing access to memory element 16. Processors 12a-12l are coupled to communications module 14 by a link 42. Link 42 may be a hyper-transport communications link or alternatively any other suitable interface that operates to exchange data between communications module 14 and any selected one of processors 12a-12l.

Each of processors 12a-12l may include a send register and a receive register as provided in register element 36. Each send register allows any selected processors 12a-12l to generate an interrupt message or signal to be communicated to any other processor 12a-12l. In addition, each receive register provided in register element 36 offers an element that allows a destination processor 12a-12l to receive a message from any other processor within system 10. Once a processor has received a message or an interrupt signal, it may then access memory element 16 in order to obtain some additional data or ancillary information associated with the interrupt signal or message delivered.

Communications module 14 may be an application specific integrated circuit (ASIC) or may alternatively be any other unit, circuit, element, or object that seeks to process or otherwise communicate data between two points. For example, communications module 14 may be a field programmable gate array (FPGA), an erasable programmable read only memory (EPROM), an electrically erasable programmable read only memory (EEPROM), a static random access memory (SRAM), a read only memory (ROM), a microcontroller, a microprocessor, or any other appropriate device or component according to particular needs. Communications module 14 includes multiple bus interfaces 22a-22c and multiple interrupt controllers 26a-26c.

Memory element 16 is a storage unit coupled to processors 12a-12l (via bus 40) that operates to provide additional information about messages or interrupt signals received by any of processors 12a-12l within system 10. In a particular embodiment of the present invention, memory element 16 represents a dedicated segment of storage that is shared amongst all processors 12a-12l. Alternatively, memory element 16 may be any suitable memory unit such as a RAM or ROM element, an FPGA, a database, or any other appropriate component or device according to particular needs. Memory element 16 allows any of the selected processors 12a-12l to read information corresponding to a message or an interrupt signal provided by the processor that originated the message. This may allow any of processors 12a-12l to identify or otherwise determine the basis for the message or interrupt signal.

In other embodiments of the present invention, memory element 16 may be disregarded or eliminated entirely. This may be appropriate in the case where any of processors 12a-12l recognize the identity of the originating processor as the basis for the message or the interrupt signal. For example, processor 12e (processor #4) may only generate messages that signify the introduction of a new component in system 10. Such a message may trigger updating functions from any of processors 12a-12l. Accordingly, if processor 12l (processor #8) identifies that processor 12e (processor #4) sent the message, it may not be necessary to access memory element 16 and read additional information. Processor 12i (processor #8) may simply respond to receipt of the message by performing a systematic updating function, which is executed each time processor 12e (processor #4) generates an interrupt signal or message.

Bus interfaces 22a-22c may be hyper-transport interfaces that can read and write data to registers contained within register element 36. Bus interfaces 22a-22c may include any suitable hardware, software, element, or object operable to provide a communicative interface between processors 12a-12l and configuration block 30. The use of bus interfaces 22a-22c as hyper-transport interfaces are offered only for purposes of teaching, whereby bus interfaces 22a-22c may alternatively implement any other suitable communications protocol that allows for communications or access to registers within configuration block 30. Bus interfaces 22a-22c may be coupled directly to register arbiter 32 where appropriate in order to properly manage requests for access to registers within configuration block 30. Bus interfaces 22a-22c may operate to receive a request initiated by a selected processor 12a-12l and communicate that request to any element within communications module 14, such as interrupt controllers 26a-26c or more directly to register arbiter 32.

Interrupt controllers 26a-26c each represent an element that operates to receive ORing outputs associated with registers within register element 36, i.e. the bits of the receive register that are ORed together to generate an interrupt for that processor. Interrupt controllers 26a-26c may include any hardware, software, element, or object operable to provide an interrupting or messaging protocol to any selected processor 12a-12l. Interrupt controllers 26a-26c may communicate information over hyper-transport interfaces in order to initiate the interrupt signal or message to be communicated to a destination processor. Alternatively, interrupt controllers 26a-26c may be directly coupled to a given processor.

In operation of an example embodiment of the present invention, when processor 12a seeks to initiate a message to processor 12b, processor 12a may set the second bit of processor 12a's send register included within register element 36. This may cause corresponding hardware or software to automatically perform three tasks: set the receive bit (the first bit of the receive register for 12b), clear the send bit (the second bit of the send register of 12a), and cause the interrupt to processor 12b. Upon receipt of the interrupt signal, processor 12b may read its associated receive register and determine that processor 12a has indicated that it has a message intended for processor 12b. The process of reading the receive register may automatically clear (set the bit to 0) the receive register or alternatively, processor 12b may then clear its receive register and suitably vector (where appropriate) to an adequate node or memory location containing the message (such as memory element 16 for example). Interrupt vectors may be hard-coded in certain embodiments of the present invention, or initialized by a microprocessor upon system initialization, or established in any other suitable manner according to particular needs.

The interrupt for a particular processor may be created by ORing all the bits of that processor's receive register. This indicates to the receiving processor that some processor has a message intended for it. The interrupt signal or message may then be communicated to a selected interrupt controller 26a-26c for a corresponding receiving processor, whereby a receive register is then properly read. This approach to multi-processor communications allows for multiple processors to communicate across multiple chips. Because the send and receive message registers are located in a centrally accessible location (configuration block 30), the ability to broadcast a message or an interrupt signal to a subset of processors or to all processors is enabled with a single data write command. System 10 provides the ability for any selected processor 12a-12l to set appropriate bits in order to initiate interrupts to all designated processors. Delivering the interrupt may utilize in-band interrupt writes via the selected processor, the external interrupt inputs or processor chips, or in any other suitable fashion according to particular needs.

Configuration block 30 includes register arbiter 32 and register element 36. Configuration block 30 is designated as inclusive of these elements. However, this arrangement is only offered for purposes of example and should not be construed to limit where register arbiter 32 or register element 36 is positioned within communications module 14. Additionally, register arbiter 32 and register element 36 may be positioned external to communications module 14 where appropriate and according to particular needs. It is critical to note that the example arrangement provided of communications module 14 and configuration block 30 is arbitrary. The configuration shown may be modified or changed significantly without departing from the scope of the present invention.

Register arbiter 32 is an interface element that manages requests for access to register element 36 from processors 12a-12l. Register arbiter 32 may include any suitable hardware, software, element, or object operable to provide this management function. Register arbiter 32 may operate to manage access requests in a round-robin fashion. Alternatively, register arbiter 32 may manage access requests in any suitable manner such that an appropriate decision process is provided in order to allow access to register element 36. Register arbiter 32 may also operate to provide reset and enable controls for system 10. Additionally, register arbiter 32 may operate to ensure proper address management for send and receive registers associated with each processor 12a-12l.

Register element 36 is a unit that includes multiple pairs of send and receive registers for each processor 12a-12l. Alternatively, register element 36 may include any suitable number of registers in any appropriate arrangement in accordance with particular needs. Moreover, a single register may provide a capability to handle both send and receive indicators for a particular processor or even a group of processors. Register element 36 may additionally include any suitable hardware or software that operates to facilitate the delivery of data to and from registers included therein. This may include software operable to position bits in each of the registers or hardware that is operable to transpose bits from a send register to a receive register for example. Register element 36 may additionally include suitable hardware or software that operates to acknowledge a bit position or to provide cleanup functions to each of the registers as bits are cleared or reset to zero for subsequent communications in system 10.

In operation, where processor 12e (processor #4) seeks to initiate an interrupt signal or a message to another or to all processors 12a-12l, processor 12e may position or otherwise write a bit to its send register. The bit may then be set or otherwise transposed to receive registers for the destination processors 12a-12l to which communication is sought. This operation triggers a respective interrupt controller 26a-26c to send an appropriate interrupt command or message over the hyper-transport interface or whatever other suitable communications bus is implemented.

Upon receipt of the interrupt signal, the destination processor may then perform processing according to the interrupt signal in order to retrieve the message. The destination processor may still need to know the reason for the interrupt or the source processor that generated the message. For example, if the message sent by processor 12e (processor #4) was intended for processor 12l (processor #11), processor 12l may then read its corresponding receive register within register element 36 and identify that the message was generated by processor 12e (processor #4). In the case where there is a single reason or basis (or an identifiable subset of reasons or bases) why processor 12e would initiate a message to be sent to processor 12l, then the interrupt signal alone may be sufficient. In such a case, the read of the receive register may automatically clear the bit(s) in the receive register. If not, memory element 16 may be accessed in order to read additional information associated with the interrupt signal. In this case, the receive bits may be cleared when the receive register is read or after the additional message has been processed.

Alternatively, processor 12l may send a request to set to 0 or have the message delivered. The message to be communicated to processor 12e may be included in the interrupt signal. Alternatively, processor 12l may be designed to retrieve the message in response to the interrupt signal. The retrieval process may involve processor 12l accessing a particular location within memory element 16, either automatically or in response to the identity of the originating processor (in this example, processor 12e). In addition, in an alternative embodiment multiple receive bits could be set at the same time (within a receive register) if more than one sending processor has a message for the same receiving processor. This may result in one interrupt, but two (or more) vectors in the interrupt service operation.

In attempting to access memory element 16, a suitable memory arbiter may be provided in communication system 10 in order to allow for efficient access and data exchanges between processors 12a-12l and memory element 16.

Figure 2A:
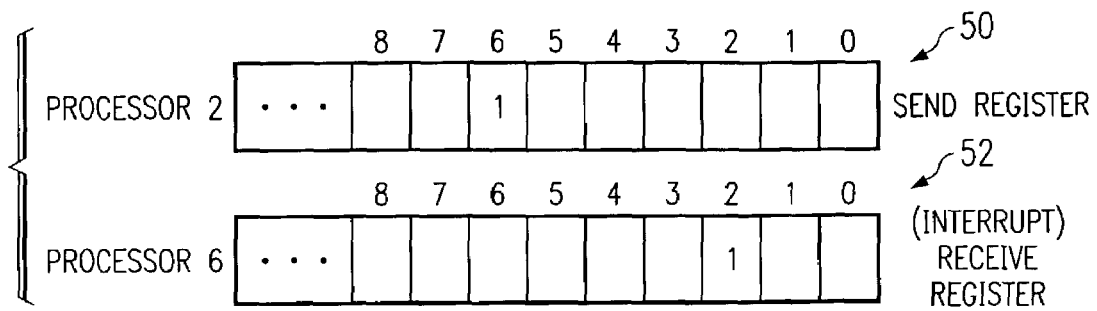
FIG. 2A is a simplified block diagram of a send register and a receive register that collectively illustrate an example communication in a multi-processor environment.

FIG. 2A is a simplified block diagram of an example send register 50 associated with processor 12c and example receive register 52 associated with processor 12g. FIG. 2A additionally represents a communication being initiated by processor 12c (processor #2) intended for processor 12g (processor #6). Each processor 12a-12l has an assigned send register and an assigned receive register, whereby each register includes one bit per processor 12a-12l within the system. Thus, in the example embodiment provided in FIG. 1, each register would include twelve bits, one bit per processor. ('N' processors=2*'N' registers, where each register may include 'N' bits.)

FIG. 2A further shows a bit positioned in the sixth segment of send register 50 for processor 12c. It is important to note that for purposes of convenience, clarity, and teaching, the numbers provided above each of send register 50 and receive register 52 are provided in consecutive order. In one example, in order to send a message to processor 12g, a bit would actually need to be positioned in the '6' segment of send register 50 for processor 12c. Another approach may allow any bit position to be associated with any processor. The bits may be positioned within send register 50 by suitable hardware where appropriate, or alternatively by any other suitable object or element that operates to position a bit in any register included within register element 36.

Hardware may then be used to transpose the bit from the '6' segment of send register 50 for processor 12c to the '2' segment of receive register 52 for processor 12g and clear (set to 0) the send register, i.e. bit '6.' Alternatively, software or any other suitable element or object may be used to transpose the bit. This bit positioning then triggers a selected interrupt controller 26a-26c to send an appropriate interrupt command or message to processor 12g. The twelve columns in the example receive register illustrated may be suitably ORed together in order to generate that interrupt message. The first bit transposed to the receive register associated with processor 12g triggers the execution of the interrupt signal and provides the advantage of a quick transmission or response time.

After processor 12g receives the interrupt, it may then read its associated receive register to see the identity of the processor that originated the message. This may operate to clear (set to 0) the receive bit. Such a message may be based on the introduction of new components in system 10, updated addressing information, function transfers between processors, signaling operations to be performed by processors, or any other suitable messages or information to be communicated to processors 12a-12l. Processor 12g may then act accordingly in response to the interrupt signal or access memory element 16 where appropriate to retrieve the message.

Figure 2B:
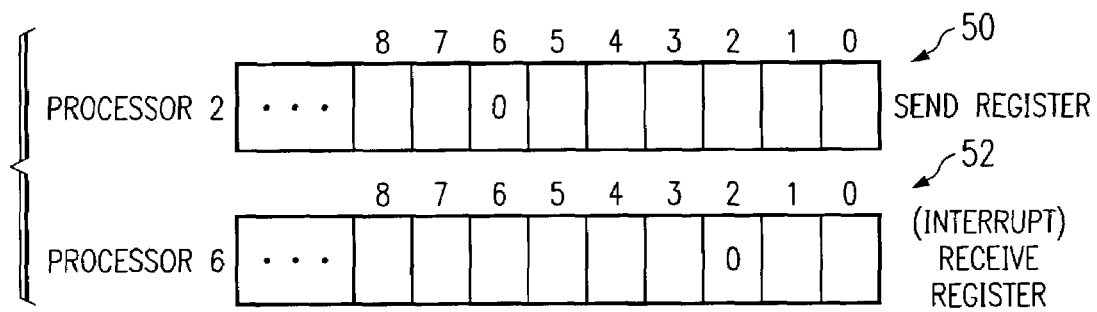
FIG. 2B is a simplified block diagram of the send register and the receive register that collectively illustrate a cleanup operation in a multi-processor environment.

FIG. 2B is a simplified block diagram of send register 50 and receive register 52 after the interrupt signal has been delivered. Software may be used to provide a cleanup function to send register 50 and receive register 52. Alternatively, hardware or any other element or object may be used to provide this cleanup functionality. The bits originally positioned in the '6' segment of send register 50 and the '2' segment of receive register 52 have been reset or otherwise cleared to zero. This allows for additional communications to proceed properly after the initial interrupt signal or message has been delivered.

Figure 2C:
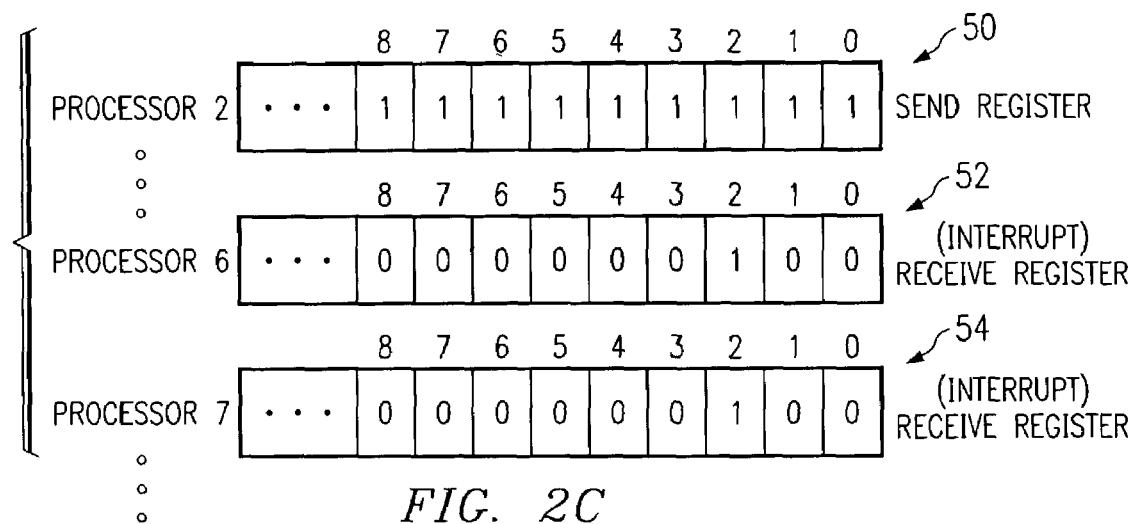
FIG. 2C is a simplified block diagram of a send register that illustrates a broadcast signal to be communicated in a multi-processor environment.

FIG. 2C is a simplified block diagram of send register 50 that illustrates an alternative communication or/interrupt signal to be generated in system 10. FIG. 2C illustrates a broadcast message initiated by send register 50, whereby each processor 12a-12l in system 10 receives an associated interrupt signal. Thus, receive register 52 (processor #6) and a receive register 54 (processor #7), as well as the remaining processors (not shown), include a bit that signals a message from send register 50 (processor #2) is intended for them. This allows any selected processor 12a-12l to easily generate a message to selected destination processors regardless of where or on which chip the destination processor resides. A single instruction may be generated that triggers the message for the interrupt signal. This single instruction provides great flexibility for processors 12a-12l in any environment by allowing a selected processor to quickly send a message to all or a certain number of processors 12a-12l using a broadcast protocol that delivers all messages concurrently.

FIG. 3 is a flowchart illustrating a series of steps associated with a method for communicating in a multi-processor environment. The method begins at step 100 where any selected processor 12a-12l generates a bit indicating that a message is to be communicated to a destination processor. Alternatively, the message may be written directly to memory element 16. The bit may be written in a send register associated with the originating processor as illustrated in step 102. At step 104, the bit may be transposed from the send register of the originating processor to a receive register associated with a destination processor. The bit in the send register may then be cleared. In response to this transposition, an interrupt signal is generated by one of interrupt controllers 26a-26c at step 106. As illustrated in step 108, the destination processor may then read the bit from its receive register in order to determine which originating processor initiated the interrupt signal.

At step 110, the destination processor may access memory element 16 (or any other suitable element or location) in response to reading the bit from the receive register. Memory element 16 may include information associated with the interrupt signal initiated by the originating processor. The receive register bits may then be cleared. At step 112, the destination processor may execute a task in response to the interrupt signal. The task may be based on the identity of the originating processor or alternatively based on information accessed by the destination processor in memory element 16.

Some of the steps illustrated in FIG. 3 may be changed or deleted where appropriate and additional steps may also be added to the flowchart. These changes may be based on specific processing architectures or particular integrated circuit arrangements and configurations of associated elements and do not depart from the scope or the teachings of the present invention.

Although the present invention has been described in detail with reference to particular embodiments, it should be understood that various other changes, substitutions, and alterations may be made hereto without departing from the spirit and scope of the present invention. For example, although the present invention has been described in conjunction with communications module 14, the present invention may be used in any processor applications where messages are sought to be exchanged by multiple processors. The use of communications module 14 has only been offered for purposes of teaching and should not be construed to limit the scope of the present invention in any way. In addition, multiple units (such as multiple integrated circuits or multiple chips) may be implemented in conjunction with system 10 in suitable environments without departing from the scope of the present invention.

Additionally, although the present invention has been described with reference to a selected number of processors (twelve in the example provided) in a designated configuration, any suitable number of processors in any appropriate arrangement may be used without departing from the teachings of the present invention. Communication system 10 may be used in networking applications, processor farms (or CPU farms) that implement data distribution protocols, or any other suitable environment where information is sought to be exchanged between two nodes or two elements.

Numerous other changes, substitutions, variations, alterations, and modifications may be ascertained by those skilled in the art and it is intended that the present invention encompass all such changes, substitutions, variations, alterations, and modifications as falling within the spirit and scope of the appended claims. Moreover, the present invention is not intended to be limited in any way by any statement in the specification that is not otherwise reflected in the appended claims.

What is claimed is:

1. A method for communicating in a multi-processor environment, comprising:
   generating a bit at an originating processor associated with a message to be communicated to a destination processor;
   positioning the bit in a send register associated with the originating processor;
   transposing the bit from the send register of the originating processor to a receive register of the destination processor;
   generating an interrupt signal in response to the bit being transposed, the interrupt signal including the message to be communicated to the destination processor;
   transmitting the interrupt signal to the destination processor.

2. The method of claim 1, wherein the memory element includes information associated with the interrupt signal initiated by the originating processor.

3. The method of claim 1, further comprising:
   executing an OR logic operation for one or more bits in one or more receive registers associated with one or more processors in order to generate one or more interrupt signals intended for one or more selected processors.

4. The method of claim 1, further comprising:
   generating a plurality of bits for the send register of the originating processor, the plurality of bits initiating a broadcast message to be communicated to a plurality of processors.

5. The method of claim 1, further comprising:
   executing, by the destination processor, a task in response to the interrupt signal, the task being based on identification of the originating processor as an initiator of the interrupt signal.

6. The method of claim 5, further comprising:
   setting the bit to zero in the send and receive registers after the task has been executed.

7. The method of claim 1, further comprising:
   communicating data associated with the send and receive registers via a communications bus operable to provide a communicative interface between the originating and destination processors and their respective send and receive registers.

8. A system for communicating in a multi-processor environment, comprising:
   means for generating a bit at an originating processor associated with a message to be communicated to a destination processor;
   means for positioning the bit in a send register associated with the originating processor;
   means for transposing the bit from the send register of the originating processor to a receive register of the destination processor;
   means for generating an interrupt signal in response to the bit being transposed, the interrupt signal including the message to be communicated to the destination processor;
   means for transmitting the interrupt signal to the destination processor.

9. The system of claim 8, wherein the memory element includes information associated with the interrupt signal initiated by the originating processor.

10. The system of claim 8, further comprising:
    means for executing an OR logic operation for one or more bits in one or more receive registers associated with one or more processors in order to generate one or more interrupt signals intended for one or more selected processors.

11. The system of claim 8, further comprising:
    means for generating a plurality of bits for the send register of the originating processor, the plurality of bits indicating that a broadcast message is to be communicated to a plurality of processors.

12. The system of claim 8, further comprising:
    means for executing a task in response to the interrupt signal, the task being based on identification of the originating processor as an initiator of the interrupt signal.

13. The system of claim 12, further comprising:
    means for setting the bit to zero in the send and receive registers after the task has been executed.

14. The system of claim 8, further comprising:
    means for communicating data associated with the send and receive registers via a communications bus operable to provide a communicative interface between the originating and destination processors and their respective send and receive registers.

15. A computer readable medium having code for communicating in a multi-processor environment, the code operable to:
    generate a bit at an originating processor associated with a message to be communicated to a destination processor;
    position the bit in a send register associated with the originating processor;
    transpose the bit from the send register of the originating processor to a receive register of the destination processor;
    generate an interrupt signal in response to the bit being transposed, the interrupt signal including the message to be communicated to the destination processor;
    transmit the interrupt signal to the destination processor.

16. The code of claim 15, further operable to:
    execute an OR logic operation for one or more bits in one or more receive registers associated with one or more processors in order to generate one or more interrupt signals intended for one or more selected processors.

17. The code of claim 15, further operable to:
    generate a plurality of bits for the send register of the originating processor, the plurality of bits indicating that a broadcast message is to be communicated to a plurality of processors.

18. The code of claim 15, further operable to:
execute a task in response to the interrupt signal, the task being based on identification of the originating processor as an initiator of the interrupt signal.

19. The code of claim 18, further operable to:
set the bit to zero in the send and receive registers after the task has been executed.

20. An apparatus for communicating in a multi-processor environment, comprising:
a send register associated with a first processor, the send register being operable to receive a bit that indicates a message to be delivered to a second processor;
a receive register associated with the second processor, wherein the bit is transposed from the send register to the receive register, the transposing of the bit being operable to initiate generation of an interrupt signal for the second processor, the interrupt signal including the message to be communicated to the second processor;
a memory element that includes information associated with the interrupt signal initiated by the first processor.

21. The apparatus of claim 20, wherein an OR logic operation is executed for one or more bits in the receive register associated with the first processor in order to generate one or more interrupt signals.

22. The apparatus of claim 20, wherein a plurality of bits are generated and positioned in each column of the send register associated with the first processor, the plurality of bits being used to initiate a broadcast signal communicated to a plurality of processors.

23. The apparatus of claim 20, wherein the second processor executes a task in response to the interrupt signal, the task being based on identification of the first processor as an initiator of the interrupt signal.

24. The apparatus of claim 20, wherein the bit is set to zero in the send and receive registers in response to the interrupt signal being processed.

25. The apparatus of claim 20, further comprising:
a communications bus operable to provide a communicative interface between the first and second processors and the send and receive registers.

26. The apparatus of claim 20, further comprising:
an application specific integrated circuit (ASIC), the ASIC including the first and second processors and the send and receive registers.

27. The apparatus of claim 20, further comprising:
a field programmable gate array (FPGA), the FPGA including the first and second processors and the send and receive registers.

28. An apparatus for communicating in a multi-processor environment, comprising:
a first processor operable to generate a bit indicating a message is to be communicated;
a send register associated with the first processor and operable to receive the bit generated by the first processor;
a second processor, the second processor being the destination for the message;
a receive register associated with the second processor, the bit being transposed from the send register to the receive register, wherein an interrupt signal associated with the second processor is generated in response to the bit being transposed, the interrupt signal indicating that the message is for the second processor, the interrupt signal including the message to be communicated to the second processor, the second processor being operable to determine origination of the message from its associated receive register.

* * * * *